(12) United States Patent
Yoon

(10) Patent No.: US 12,498,078 B2
(45) Date of Patent: Dec. 16, 2025

(54) DISPLAY DEVICE

(71) Applicant: LG DISPLAY CO., LTD., Seoul (KR)

(72) Inventor: Kyoungsang Yoon, Paju-si (KR)

(73) Assignee: LG Display Co., Ltd (KR)

( * ) Notice: Subject to any disclaimer, the term of this patent is extended or adjusted under 35 U.S.C. 154(b) by 115 days.

(21) Appl. No.: 18/385,225

(22) Filed: Oct. 30, 2023

(65) Prior Publication Data

US 2024/0218957 A1 Jul. 4, 2024

(30) Foreign Application Priority Data

Dec. 28, 2022 (KR) ........................ 10-2022-0187614

(51) Int. Cl.
*F16M 11/00* (2006.01)
*F16M 11/08* (2006.01)
*G02F 1/1333* (2006.01)

(52) U.S. Cl.
CPC ....... *F16M 11/08* (2013.01); *G02F 1/133314* (2021.01)

(58) Field of Classification Search
None
See application file for complete search history.

(56) References Cited

U.S. PATENT DOCUMENTS

| | | | | |
|---|---|---|---|---|
| 11,416,034 | B2* | 8/2022 | Yoo | G09F 9/301 |
| 12,035,494 | B2* | 7/2024 | Cho | G06F 1/1652 |
| 2015/0296641 | A1* | 10/2015 | Song | F16M 11/18 |
| | | | | 361/679.01 |
| 2020/0323087 | A1* | 10/2020 | Hwang | G06F 1/1652 |
| 2022/0201883 | A1* | 6/2022 | Cho | G02F 1/133305 |
| 2022/0210937 | A1* | 6/2022 | Yun | G06F 1/1652 |
| 2023/0209742 | A1* | 6/2023 | Cho | G06F 1/1652 |
| | | | | 361/807 |
| 2024/0219964 | A1* | 7/2024 | Cha | G06F 1/1641 |
| 2024/0221543 | A1* | 7/2024 | Eum | G06F 1/1601 |
| 2025/0071918 | A1* | 2/2025 | Kang | H05K 5/0226 |

FOREIGN PATENT DOCUMENTS

| | | |
|---|---|---|
| KR | 10-2017-0077870 A | 7/2017 |
| KR | 10-2021-0105488 A | 8/2021 |

* cited by examiner

*Primary Examiner* — Steven M Marsh
(74) *Attorney, Agent, or Firm* — Fish & Richardson P.C.

(57) ABSTRACT

A display device includes a panel frame and a bending member arranged on the panel frame and configured to deform the shape of the panel frame, wherein the bending member includes a shaft assembly arranged on the panel frame and a driving unit arranged on the panel frame and configured to deform the shaft assembly, which, according to the present disclosure, allows users to switch between a flat screen and a curved screen easily and freely.

20 Claims, 19 Drawing Sheets

DISPLAY DEVICE

CROSS-REFERENCE TO RELATED APPLICATION

The present application claims the priority of Korean Patent Application No. 10-2022-0187614, filed on Dec. 28, 2022, which is hereby incorporated by reference in its entirety.

BACKGROUND

Field of the Disclosure

The present disclosure relates to a display device.

Description of the Background

Liquid crystal display (LCD) devices and organic light emitting display (OLED) devices are examples of display devices.

Meanwhile, display devices may have flat screens or curved screens. In the past, consumers used to buy display devices based on their preferences for either flat or curved screens.

Recent technological advancements have led to the development of display devices that may be switched between flat and curved screens based on user preferences. For such screen-switching display devices, the key factor may be how easily and freely users may implement an accurate curvature shape of the screen.

SUMMARY

Accordingly, the present disclosure is directed to a display device that substantially obviates one or more of problems due to limitations and disadvantages described above.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

More specifically, the present disclosure is to provide a display device that allows users to switch between flat and curved screens with ease and freedom.

The present disclosure is not limited to the aforesaid, and other features not described herein with be clearly understood by those skilled in the art from the descriptions below.

To achieve these and other advantages and in accordance with the present disclosure, as embodied and broadly described, a display device includes a panel frame, and a bending member arranged on the panel frame and configured to deform the shape of the panel frame, wherein the bending member may include a shaft assembly arranged on the panel frame and a driving unit arranged on the panel frame and configured to deform the shaft assembly.

Also, in an aspect of the present disclosure, the shaft assembly may include a flexible shaft arranged on a rear surface of the panel frame and configured to deform in shape, a support member connected to the rear surface of the panel frame and configured to support one end of the flexible shaft, and a guide member arranged on the rear surface of the panel frame and configured to guide deformation of the flexible shaft.

Also, in an aspect of the present disclosure, the guide member may include a plurality of guide blocks arranged parallel on the rear surface of the panel frame and a shaft hole formed in the guide blocks to be penetrated by the flexible shaft.

Also, in an aspect of the present disclosure, the guide blocks may include a center block in which the shaft hole is formed, a first side block arranged in the direction facing the panel frame from the center block and extending in both lateral directions of the center block, and a second side block arranged in the opposite direction to the first side block and extending in both lateral directions of the center block.

Also, in an aspect of the present disclosure, the first side blocks adjacent to each other, among the plurality of guide blocks, may be configured to be spaced apart at a predetermined distance at one end thereof in response to the flexible shaft being in a straight shape and come into contact with each other at the one end thereof to limit the range of curvature of the flexible shaft in response to the flexible shaft being transitioned from the straight shape to a curved shape.

Also, in an aspect of the present disclosure, the second side blocks adjacent to each other, among the plurality of guide blocks, may be configured to come into contact at one end thereof, in response to the flexible shaft being in a straight shape, to maintain the panel frame in a flat shape.

Also, in an aspect of the present disclosure, the guide member may include a wire hole formed to penetrate both sides of the first side block and a wire inserted into the wire hole to connect the plurality of guide blocks.

Also, in an aspect of the present disclosure, the guide member may include a beam support loop arranged on the second side block and a flexible beam arranged to penetrate the beam support loop and connect the plurality of guide blocks.

Also, in an aspect of the present disclosure, one of the first side blocks adjacent to each other may include a first convex portion protruding outward the one end thereof, another one of the first side blocks adjacent to each other may include a first concave portion recessed inward the one end thereof.

Also, in an aspect of the present disclosure, one of the second side blocks adjacent to each other may include a second convex portion protruding outward the one end thereof, another one of the second side blocks adjacent to each other may include a second concave portion recessed inward the one end thereof.

Also, in an aspect of the present disclosure, the guide member further includes a damper member arranged between a contact surface between the first concave portion and the first convex portion or between the second concave portion and the second convex portion to absorb shocks, wherein the damper member may include a first damper arranged on the first concave portion or the first convex portion and having a damper hole formed to be penetrated by the wire and a second damper arranged on the second concave portion or the second convex portion.

Also, in an aspect of the present disclosure, the guide member may include an end block configured to support the other end of the flexible shaft, an end shaft hole formed in the end block to be penetrated by the other end of the flexible shaft, an end wire hole formed in the end block and coupled to an end of the wire, and an end bracket formed on the end block and coupled to one end of the flexible beam.

Also, in an aspect of the present disclosure, the guide member may further include a guide rail arranged on the rear surface of the panel frame and configured to guide a movement direction of the end block.

Also, in an aspect of the present disclosure, the guide rail may include a rail body, a guide groove formed in a recessed form on the rail to receive the end block, and a guide wall formed to protrude from the sides of the guide groove on the rail body and guide the movement of the end block.

Also, in an aspect of the present disclosure, the support member may include a fixed plate connected to the rear surface of the panel frame, a line groove formed in the fixed plate in the direction of arrangement of the flexible shaft to receive the wire, and a fixing block arranged on the fixed plate and coupled to the one end of the flexible shaft.

Also, in an aspect of the present disclosure, the driving unit may include a gear unit arranged on the rear surface of the panel frame and connected to the shaft assembly and a lever connected to the gear unit via a lever shaft, wherein the gear unit may be driven by rotating the lever.

Also, in an aspect of the present disclosure, the gear unit may include a lever gear connected to the lever shaft and having gear teeth formed on a part of a peripheral surface thereof, a first gear arranged adjacent to the lever gear and configured to mesh with the lever gear in response to rotation of the lever gear, a linear gear arranged along a length direction of the flexible beam, and a second rear connected to the first gear via a gear shaft and meshed with the linear gear.

Also, in an aspect of the present disclosure, the gear unit may further include a link piece connecting the second gear and the wire.

Also, in an aspect of the present disclosure, the display device further includes a stand connected to the panel frame and placed on a supporting surface, wherein the driving unit may include a first lever groove formed on the stand to receive the lever in response to the lever rotating for the flexible shaft to be in a straight shape and a second lever groove formed on the stand to receive the lever in response to the lever rotating for the flexible shaft to be in a curved shape.

Also, in an aspect of the present disclosure, the flexible support may be arranged in pairs in both directions of the panel frame with respect to the fixed plate on which a pair of fixing blocks are arranged to be spaced apart to support one ends of the pair of flexible shafts, respectively, and the second gear may be arranged in pairs between the pair of the fixing blocks and connected each to each of the pair of the first gears meshed with the lever gear.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
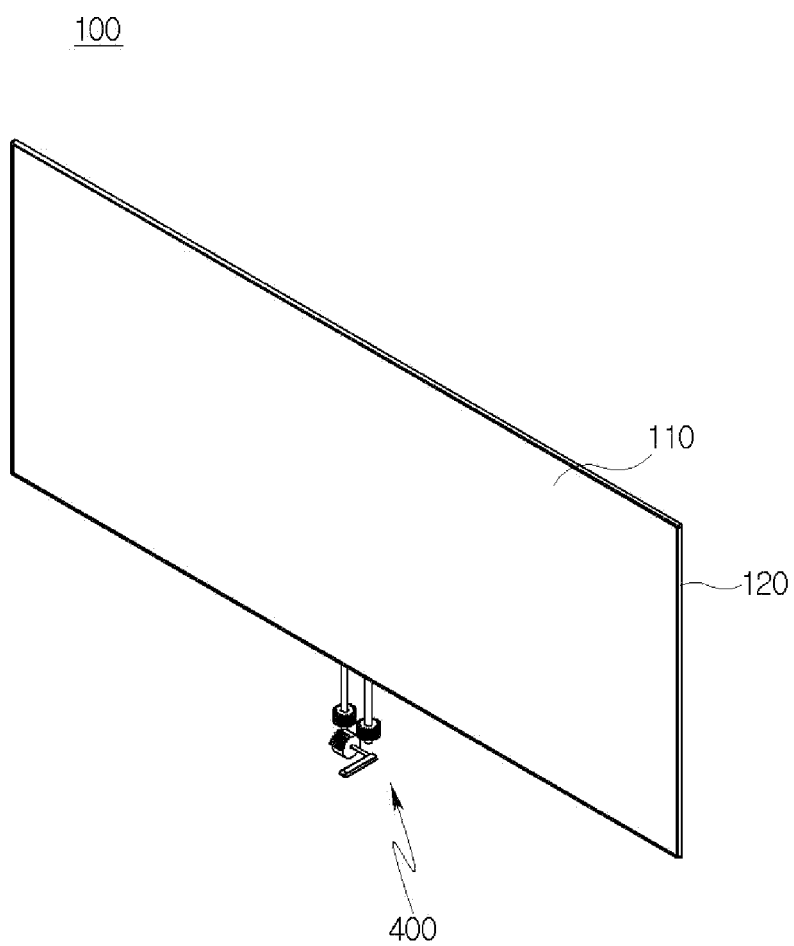
FIG. 1 is a front perspective view illustrating a display device according to an aspect of the present disclosure.

Advantages and features disclosed in the present disclosure and methods of accomplishing the same may be understood more readily by reference to the detailed description of aspects that will be made hereinafter with reference to the accompanying drawings. However, the present disclosure may be embodied in many different forms and should not be construed as being limited to the exemplary aspects set forth herein; rather, these exemplary aspects are provided so that the present disclosure will be thorough and complete and will fully convey the concept of the disclosure to those skilled in the art, and the disclosure will only be defined by the appended claims.

The shapes, sizes, ratios, angles, numbers and the like illustrated in the drawings to describe aspects disclosed in the disclosure are merely exemplary, and thus, the disclosure is not limited thereto. Throughout the disclosure, the same reference numerals refer to the same components. In addition, detailed descriptions of well-known technologies may be omitted in the disclosure to avoid obscuring the subject matter of the disclosure. When terms such as "comprises," "has," "includes," or "is made up of" are used in the present disclosure, it should be understood that unless "only" is specifically used, additional elements or steps may be included. Unless otherwise explicitly stated, when a component is expressed in the singular form, it is intended to encompass the plural form as well.

In interpreting the components, it is construed to include a margin of error even in the absence of explicit description.

When describing the positional relationship, for example, when the relationship between two parts is described as "on", "on top of", "underneath", "beside", etc., unless "directly" or "immediately" is used, one or more other parts may be located between the two parts.

When a device or layer is referred to as being "on" another device or layer, it includes cases where one device or layer is directly located on the other device or layer or still other device or layer is interposed between the two devices or layers.

Although the terms "first", "second", and the like are used to describe various components, these components are not limited by these terms. These terms are merely used for distinguishing one component from the other components. Therefore, the first component mentioned hereinafter may be the second component in the technical sense of the present disclosure.

Throughout the disclosure, the same reference numerals refer to the same components.

The sizes and thicknesses of each component shown in the drawings are presented for the convenience of description and are not intended to limit the present disclosure.

The features of various aspects of the present disclosure may be partially or entirely combined or assembled in various technical manners of interlocking and interoperation obvious to those skilled in the art, and each aspect may be implemented independently or in combination with related aspects.

Hereinafter, detailed descriptions are made of the aspects with reference to the accompanying drawings.

In the present disclosure, the term "display device" is used in a narrow sense to refer to display devices, such as a liquid crystal module (LCM), an organic light-emitting diode (OLED) module, and a quantum dot module, each including a display panel and a panel driving unit to operate the display panel. In addition, the term may also be used to refer to set electronic devices, set devices, or apparatuses that include LCMs, OLED modules, QD modules, and the like, such as equipment display apparatuses including complete or final products such as laptop computers, televisions, computer monitors, automotive displays or equipment displays provided in other forms for vehicles, as well as mobile electronic devices such as smartphones or electronic pads.

Accordingly, in the present disclosure, the display device may include not only the display devices in the narrow sense themselves, such as LCMs, OLED modules, QD modules, but also set devices as application products or final consumer devices each including LCMs, OLED modules, QD modules, and the like.

Additionally, in some cases, an LCM, an OLED module, or a QD module, composed of a display panel and a panel driving unit may be referred to as "display device" in a narrow sense, while an electronic device as a complete product including an LCM, an OLED module, or a QD module may be referred to as "set device." For example, the narrow-sense display device may include a display panel of liquid crystal (LCD), organic light-emitting diode (OLED), or quantum dot (QD) and a source printed circuit board (PCB) as a control unit for driving the display panel, while a set device may further include a set PCB, serving as a set control unit that is electrically connected to the source PCB and controls the entire set device.

The display panel used in the aspects of the present disclosure may include all types of display panels such as liquid crystal display panels, organic light-emitting diode (OLED) display panels, quantum dot (QD) display panels, and electroluminescent display panels, and is not limited to a specific display panel capable of bending a bezel with a flexible substrate for the OLED display panel and a backplate support structure thereunder. In addition, the display panel used in the aspects of the present disclosure is not limited to the shape or size of the display panel.

For example, when the display panel is an organic light-emitting diode (OLED) display panel, it may include a plurality of gate lines and data lines and pixels formed at the intersection of the gate lines and data lines. In addition, it may be configured to include an array including thin-film transistors as components for selectively applying a voltage to each pixel, an organic light-emitting diode (OLED) layer on the array, an encapsulation substrate or encapsulation layer arranged on the array to cover the organic light-emitting diode layer, etc.

The encapsulation layer may protect the thin film transistors and the organic light-emitting device layer from external impacts and prevent moisture or oxygen from penetrating the organic light-emitting device layer. In addition, the layers formed on the array may include an inorganic light-emitting layer, such as a nano-sized material layer or quantum dots.

Figure 2:
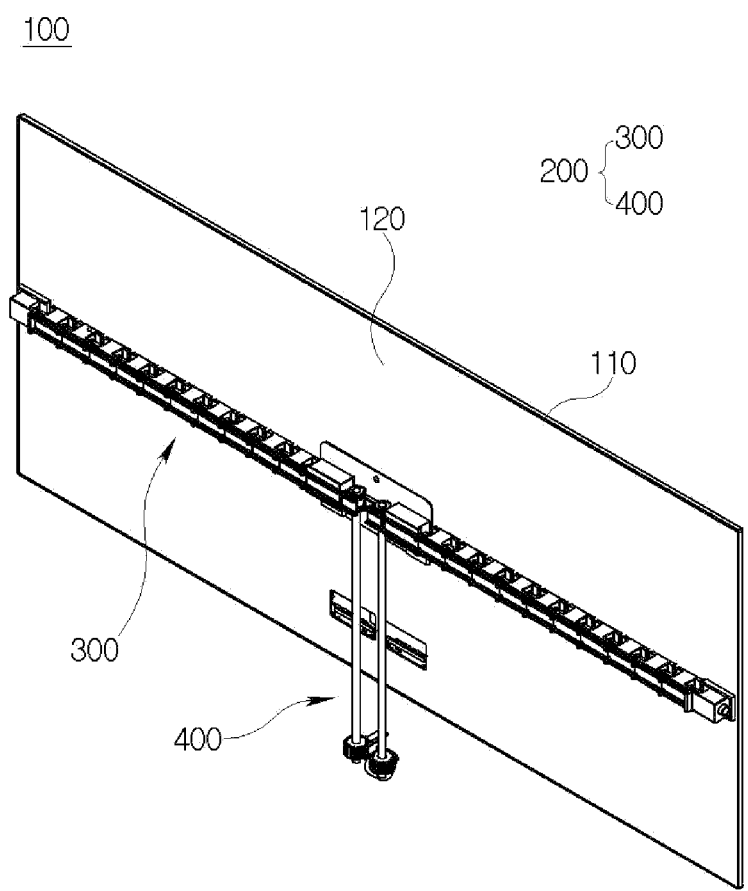
FIG. 2 is a rear perspective view illustrating a display device according to an aspect of the present disclosure.
Figure 3:
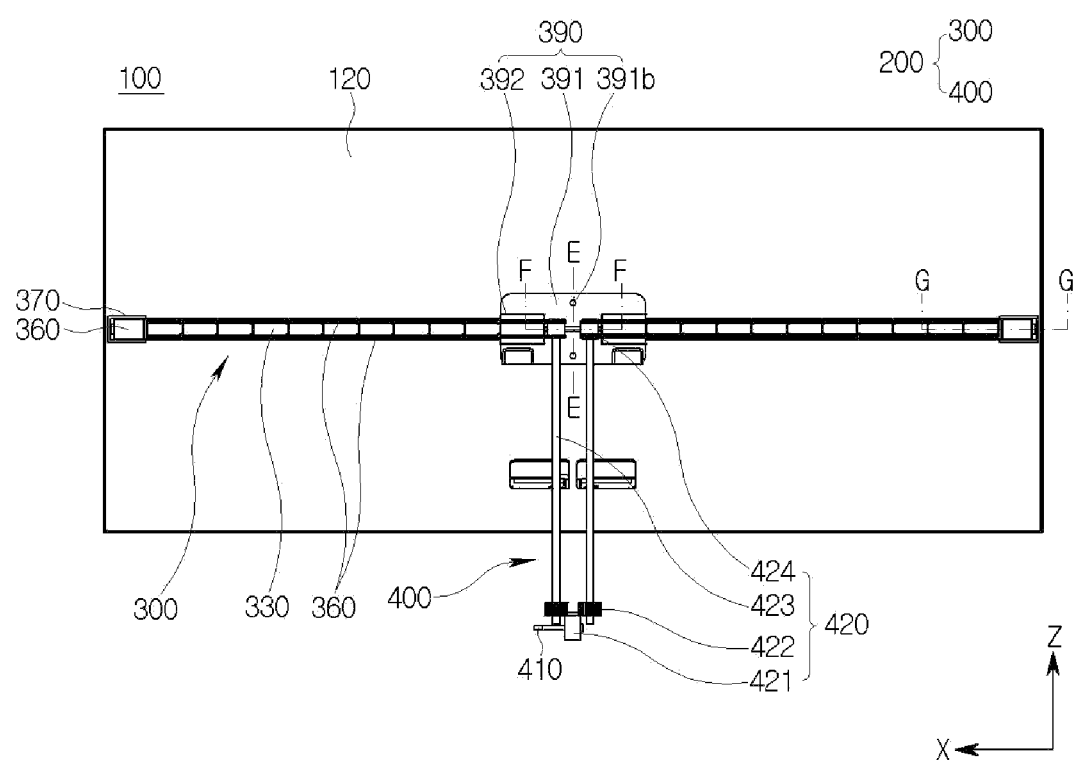
FIG. 3 is a rear view illustrating a display device according to an aspect of the present disclosure.
Figure 4:
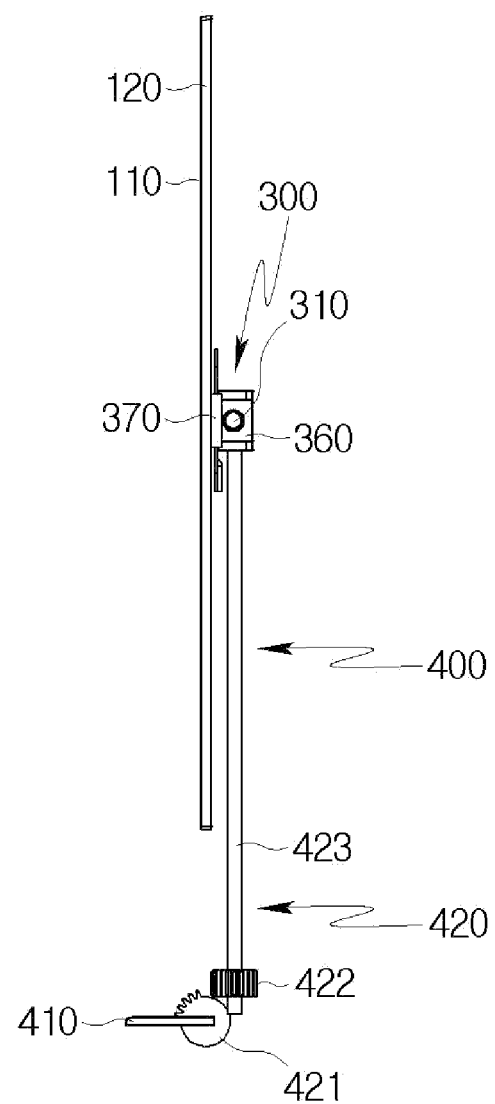
FIG. 4 is a side view illustrating a display device according to an aspect of the present disclosure.
Figure 5:
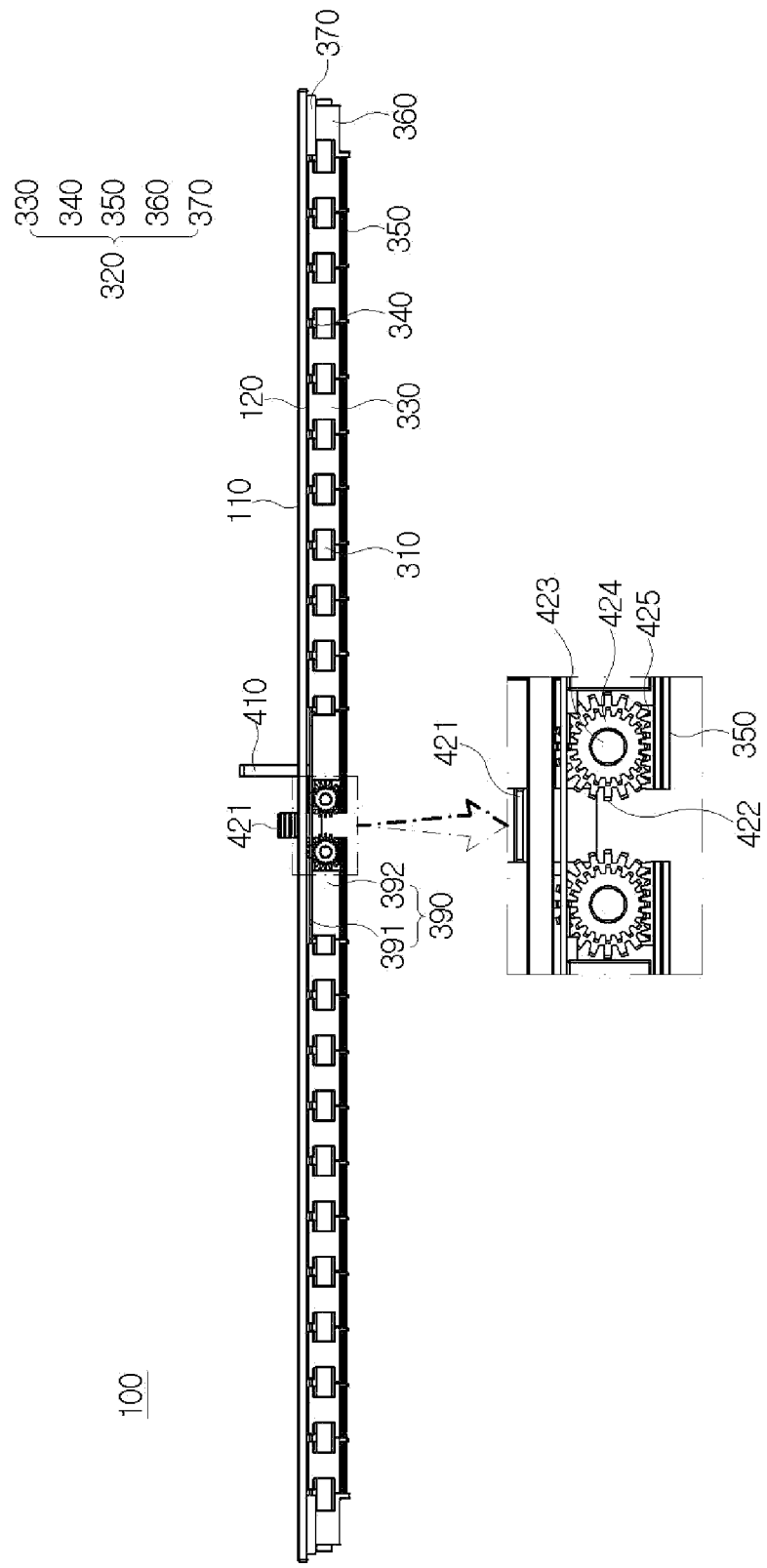
FIG. 5 is a top view illustrating a display device according to an aspect of the present disclosure

FIG. 1 is a front perspective view illustrating a display device 100 according to an aspect of the present disclosure, FIG. 2 is a rear perspective view illustrating the display device 100 according to an aspect of the present disclosure, FIG. 3 is a rear view illustrating the display device 100 according to an aspect of the present disclosure, FIG. 4 is a side view illustrating the display device 100 according to an aspect of the present disclosure, and FIG. 5 is a top view illustrating the display device 100 according to an aspect of the present disclosure.

Figure 6:
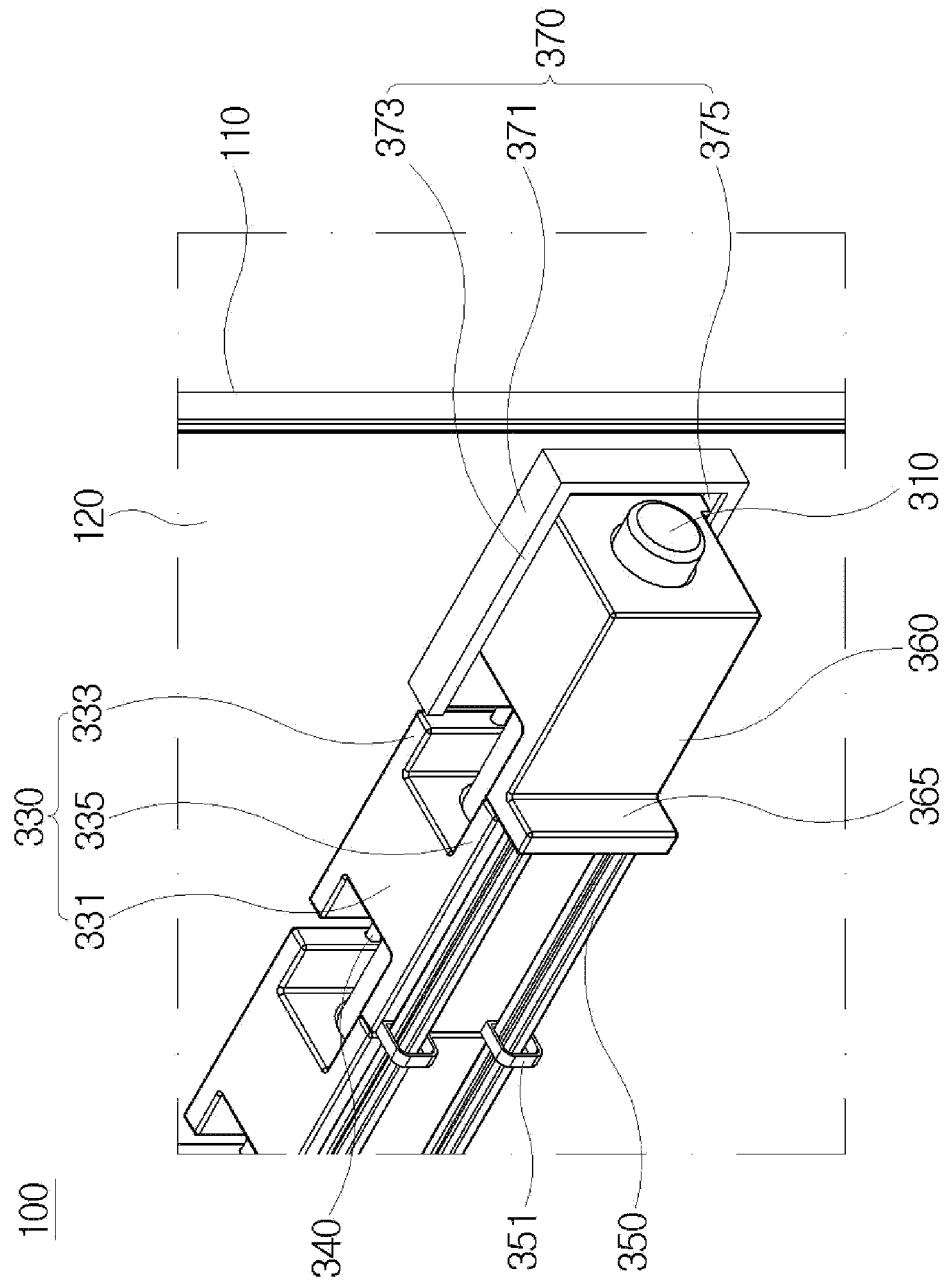
FIG. 6 is a diagram illustrating a guide rail and an end block of a shaft assembly according to an aspect of the present disclosure.
Figure 7:
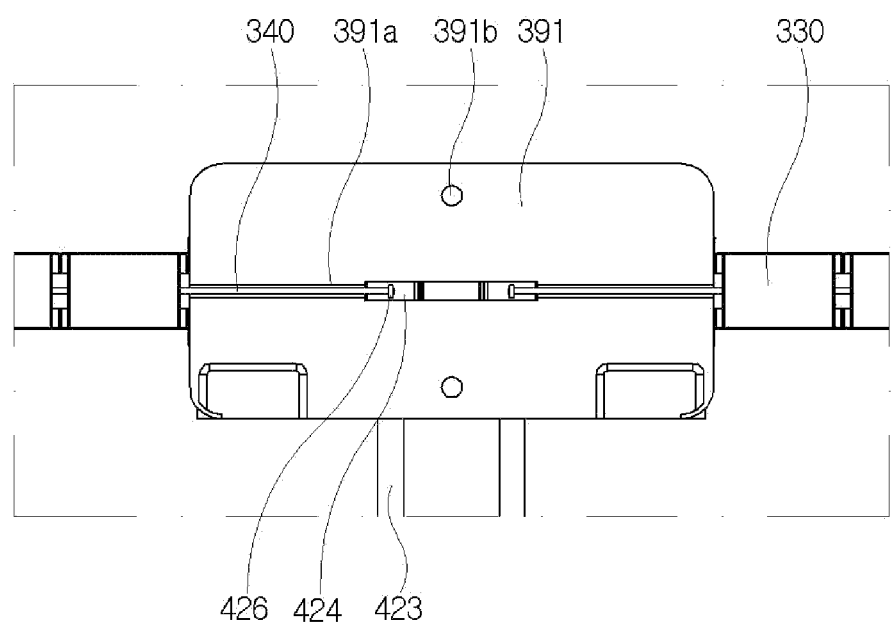
FIG. 7 is a diagram illustrating a front part of a support member according to an aspect of the present disclosure.
Figure 8:
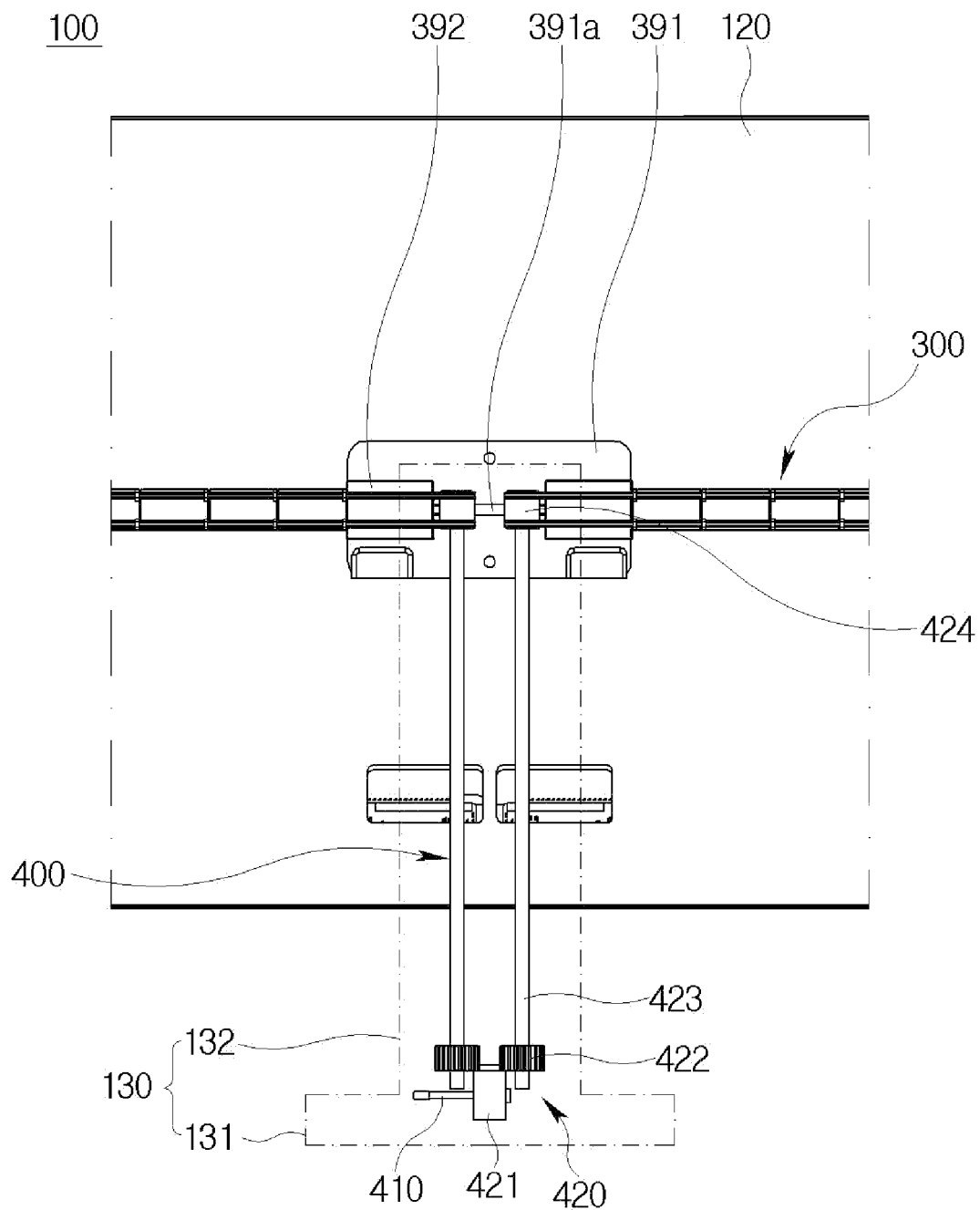
FIG. 8 is a diagram illustrating a rear part of a support member and a driving unit according to an aspect of the present disclosure.

Also, FIG. 6 is a diagram illustrating a guide rail 370 and an end block 360 of a shaft assembly 300 according to an aspect of the present disclosure, FIG. 7 is a diagram illustrating a front part of a support member 390 according to an aspect of the present disclosure, and FIG. 8 is a diagram illustrating a rear part of the support member 390 and a driving unit 400 according to an aspect of the present disclosure.

Figure 11:
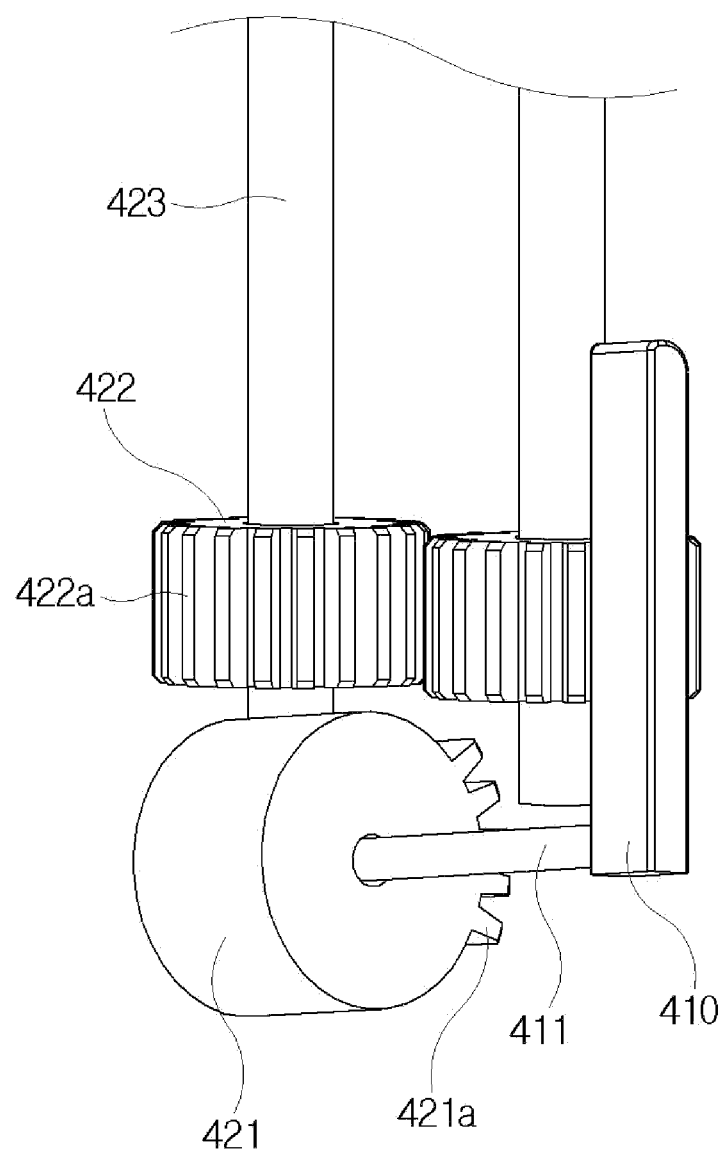
FIG. 11 is a cross-sectional view taken along line E-E in FIG. 3.
Figure 12:
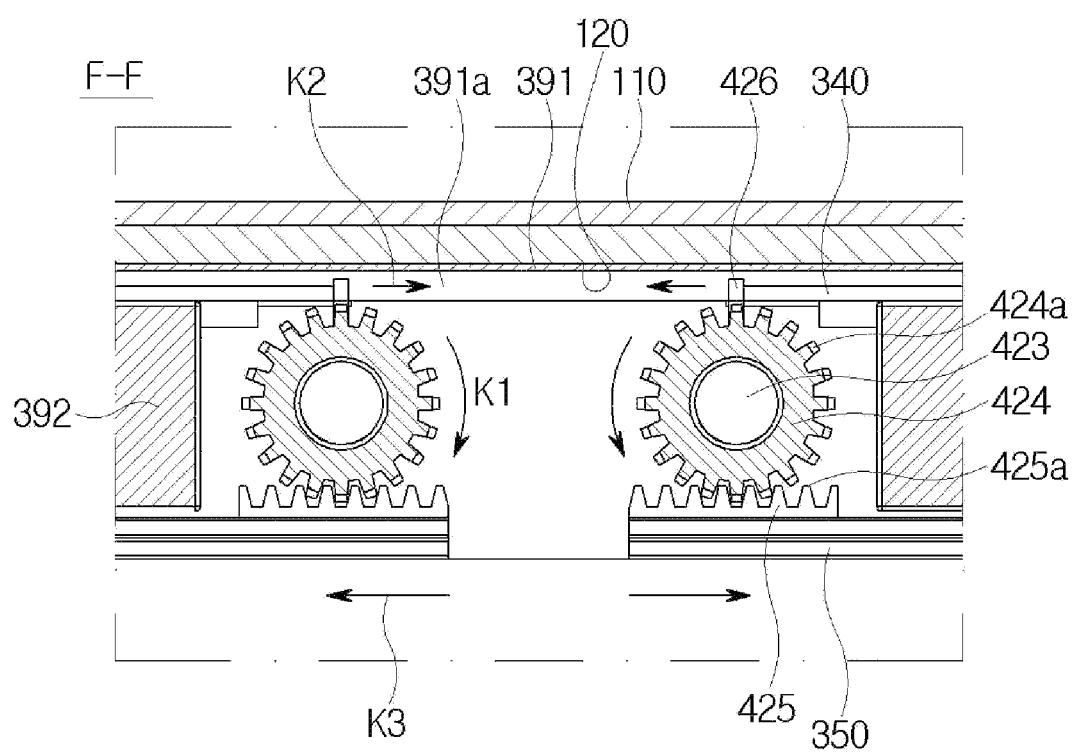
FIG. 12 is a cross-sectional view taken along line F-F in FIG. 3.
Figure 13:
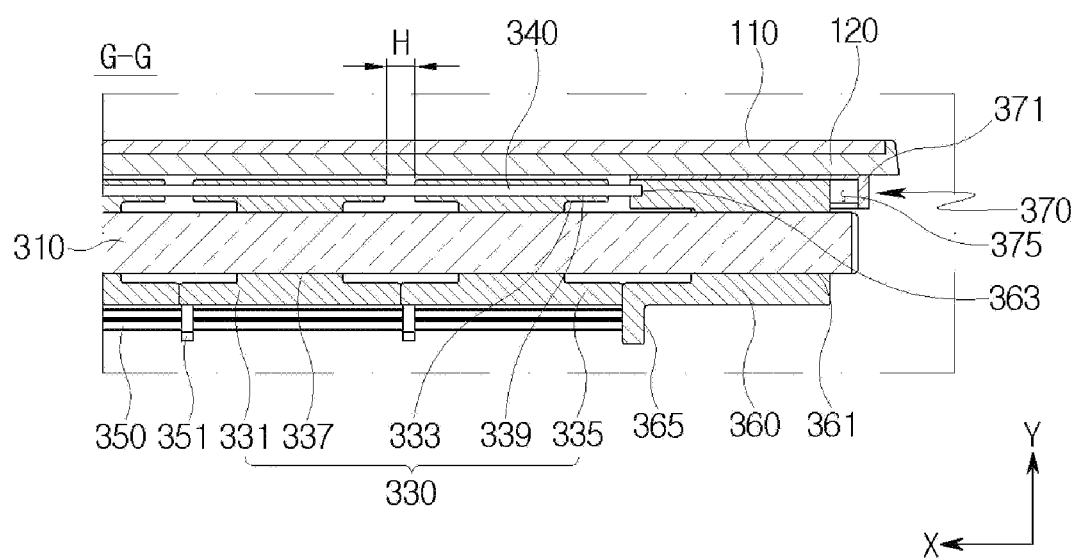
FIG. 13 is a cross-sectional view taken along line G-G in FIG. 3.

Also, FIG. 11 is a cross-sectional view taken along line E-E in FIG. 3, FIG. 12 is a cross-sectional view taken along line F-F in FIG. 3, and FIG. 13 is a cross-sectional view taken along line G-G in FIG. 3.

With reference to FIGS. 1 to 8, the display device 100 according to an aspect of the present disclosure may include a panel frame 120 and a bending member 200.

In an aspect of the present disclosure, the panel frame 120 may be square in shape, but is not necessarily limited thereto. On the front of the panel frame 120, the display panel 110 may be disposed, and a panel driving unit (not shown) for driving the display panel 110 may be arranged inside the panel frame 120. Here, the display panel 110 may be implemented with a structure deformable, particularly, switchable between a flat shape and a curved shape.

The bending member 200 may be arranged on the panel frame 120 and may deform the shape of the panel frame 120.

In an aspect of the present disclosure, the shape of the panel frame 120 may be deformed between a flat shape and a curved shape, but is not necessarily limited thereto.

To deform the display panel 110 and the panel frame 120, the bending member 200 may include a shaft assembly 300 and a driving unit 400.

The shaft assembly 300 may be arranged on the panel frame 120. With reference to FIG. 3, the shaft assembly 300 may be arranged in the X-axis direction on the rear side of the panel frame 120 in an aspect of the present disclosure. Accordingly, when the shaft assembly 300 is deformed, the sides of the panel frame 120 may be deformed in line with the direction of deformation of the shaft assembly 300.

However, the configuration is not limited thereto, and it may be arranged on the front side of the panel frame 120 or in the Z-axis direction on the rear side of the panel frame 120 in other aspects.

The driving unit 400 may be placed on the panel frame 120 and may deform the shaft assembly 300. With reference to FIG. 8, a stand 130 may be connected to the lower portion of the panel frame 120 to anchor the panel frame 120 to the ground or a specific location. In the present case, the driving unit 400 may be disposed on the stand 130 to allow for a simple user operation to switch the display panel 110 and the panel frame 120 between flat and curved shapes.

With reference to FIGS. 3 and 5, the shaft assembly 300 may include a flexible shaft 310, a support member 390, and a guide member 320.

The flexible shaft 310 may be disposed on the rear side of the panel frame 120 and deformable in shape. In an aspect of the present disclosure, the flexible shaft 310 may be deformed between a straight shape and a curved shape. In an aspect of the present disclosure, the flexible shaft 310 may have a structure like a metal cable in which multiple wires 340 are twisted together, but other materials that may maintain durability even with frequent deformations may also be adopted without necessarily being limited thereto.

The support member 390 may be coupled to the rear portion of the panel frame 120 and may support one end of the flexible shaft 310. Here, the support member 390 may be positioned at the center of the rear side of the panel frame 120, and the flexible shaft 310 may be arranged in pairs along the X-axis direction on the rear side of the panel frame 120 with the support member 390 as a reference.

In an aspect of the present disclosure, the support member 390 may include a fixed plate 391 and a fixing block 392.

The fixed plate 391 may be flat in shape and have fastening holes 391b formed therein to be coupled to the rear of the panel frame 120 by fastening bolts (not shown).

In addition, with reference to FIG. 7, a line groove 391a may be formed on the fixed plate 391 in the X-axis direction, i.e., in the direction of arrangement of the flexible shaft 310, and a wire 340 may be inserted and arranged in the line groove 391a. The wire 340 may be guided and move along the line groove 391a in the X-axis direction.

The fixing block 392 may be arranged on the fixed plate 391 and coupled to an end of the flexible shaft 310.

In an aspect of the present disclosure, the fixed plate 391 may have a square plate shape and the fixing block 392 may have a square block shape, but they are not limited thereto.

Meanwhile, the guide member 320 may be arranged on the rear side of the panel frame 120 and may guide the deformation of the flexible shaft 310. That is, when the flexible shaft 310 is deformed from a straight shape to a curved shape, the guide member 320 may also be deformed from a straight arrangement to a curved arrangement, supporting and guiding the deformation of the flexible shaft 310.

With reference to FIGS. 3, 6, and 13, in an aspect of the present disclosure, the guide member 320 may include a guide block 330, a wire 340, a flexible beam 350, an end block 360, and a guide rail 370.

The guide block 330 may be arranged in multiple pieces on the rear side of the panel frame 120, and a plurality of guide blocks 330 may be arranged parallel to the X-axis direction on the rear side of the panel frame 120.

Here, a shaft hole 337 may be formed on the guide block 330, and the flexible shaft 310 may be arranged by penetrating the shaft hole 337. That is, the flexible shaft 310 may penetrate the plurality of guide blocks 330 to be arranged in parallel to each other.

The guide block 330 may include a center block 331, a first side block 333, and a second side block 335.

The center block 331 may have a square block shape, and a shaft hole 337 may be formed in the center block 331. That is, the flexible shaft 310 may be arranged to penetrate a plurality of center blocks 331.

The first side block 333 may be arranged facing the panel frame 120 from the center block 331 and may be extended in both directions of the center block 331.

The second side block 335 may be arranged in the opposite direction of the first side block 333 from the center block 331 and may be extended in both directions of the center block 331.

Here, when the flexible shaft 310 is in a straight shape, the ends of adjacent first side blocks 333 of the plurality of the guide blocks 330 may be arranged to be spaced apart at a predetermined distance (shown as H in FIG. 13).

When the flexible shaft 310 is deformed from a straight shape to a curved shape, the ends of adjacent first side blocks 333 may come into contact with each other, limiting the range of curvature of the flexible shaft 310.

The predetermined distance (H) allows space for movement between adjacent first side blocks 333 when the flexible shaft 310 is deformed in the Y-axis direction. In addition, the predetermined distance (H) allow the ends of the first side blocks 333 to come into contact with each other, limiting the range of curvature of the flexible shaft 310. Here, the predetermined distance (H) may be determined as a design disclosure that takes into account the curvature, visibility, and excessive deformation prevention of the display panel 110.

When the flexible shaft 310 is in a straight shape, the ends of adjacent second side blocks 335 of the plurality of guide blocks 330 may come into contact with each other to maintain the planar shape of the display panel and the panel frame 120.

With reference to FIG. 13, it may be shown that the ends of adjacent second side blocks 335 are in contact with each other, preventing excessive movement of the flexible shaft 310 in the −Y direction.

For example, when the user operates the driving unit 400 to transition the panel frame 120 from a curved shape to a flat shape, the flexible shaft 310 may excessively move in the −Y direction due to issues with a gear unit 420 of the driving unit 400. In the present case, since the ends of adjacent second side blocks 335 are arranged to be in contact with each other in the flat shape of the panel frame 120, excessive movement of the flexible shaft 310 in the −Y direction is limited, and the panel frame 120 may maintain its flat shape even in case of malfunction of the driving unit 400.

Meanwhile, with reference to FIG. 13, a wire hole 339 may be formed to penetrate both sides of the first side block 333. The wire 340 may be inserted into the wire hole 339, connecting the plurality of guide blocks 330. That is, the wire 340 may be arranged to pass through and connect the plurality of first side blocks 333 such that the plurality of guide blocks 330 are connected via the wire 340.

A beam support loop 351 may be formed on the second side block 335. The beam support loop 351 may have a looped shape that allows for penetration (see FIG. 11), and the flexible beam 350 may be arranged to pass through the beam support 351. The beam support loop 351 may prevent the flexible beam 350, which bends in a curved shape, from detaching from the guide block 330.

As shown in FIG. 13, the flexible beam 350 passes through a plurality of beam support loops 351, connecting the plurality of guide blocks 330.

As per the above-described configuration, the wire 340 connects the plurality of guide blocks 330 located on the side of the panel frame 120, while the flexible beam 350 connects the plurality of guide blocks 330 on the opposite side, away from the panel frame 120.

Figure 14:
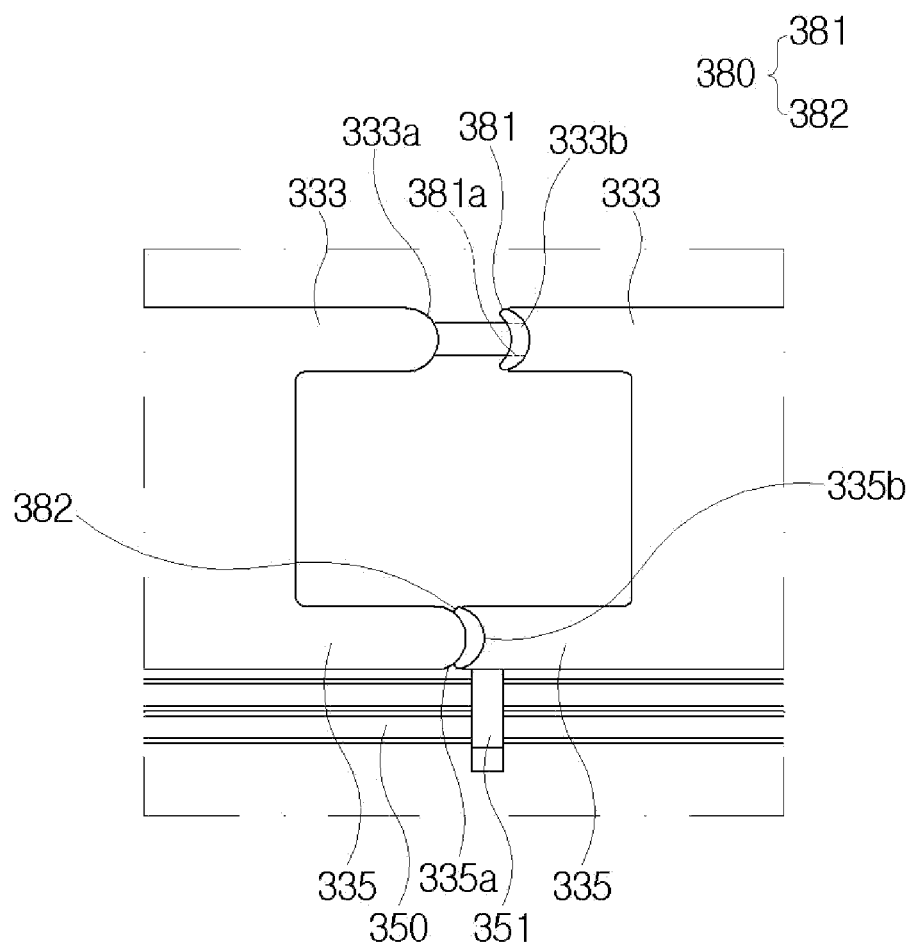
FIG. 14 is a diagram illustrating first and second concave portions and first and second convex portions according to an aspect of the present disclosure.

Meanwhile, FIG. 14 is a diagram illustrating first and second concave portions 333*b* and 335*b* and first and second convex portions 333*a* and 335*a* according to an aspect of the present disclosure.

With reference to FIG. 14, the guide block 330 may further include first and second convex portions 333*a* and 335*a*, first and second concave portions 333*b* and 335*b*, and a damper member 380.

The first convex portion 333*a* may be formed to protrude outward from one end of any one of the adjacent first side blocks 333.

The first concave portion 333*b* may be formed recessed inward from one end of another one of the first side blocks 333 facing an end of one of the first side blocks 333.

In addition, the second convex portion 335*a* may be formed to protrude outward from one end of any one of the adjacent second side blocks 335.

The second concave portion 335*b* may be formed recessed inward from one end of another one of the second side blocks 335, facing an end of one of the second side blocks 335.

The damper member 380 may be arranged on the contact surface of the first concave portion 333*b* and the first convex portion 333*a*, or on the contact surface of the second concave portion 335*b* and the second convex portion 335*a* to absorb shocks.

These damper member 380 may include a first damper 381 and a second damper 383.

The first damper 381 may be arranged on the first concave portion 333*b* or the first convex portion 333*a* and formed to have a damper hole 381*a* through which the wire 340 passes.

When the panel frame 120 is in a curved shape, the first damper 381 may come into contact with the first concave portion 333*b* and the first convex portion 333*a*, thereby preventing the first concave portion 333*b* and the first convex portion 333*a* from wearing or being damaged by shocks during the contact process.

The second damper 383 may be arranged on the second concave portion 335*b* or the second convex portion 335*a*.

When the panel frame 120 is in a flat shape, the second damper 383 may come into contact with the second concave portion 335*b* and the second convex portion 335*a*, thereby preventing the second concave portion 335*b* and the second convex portion 335*a* from wearing or being damaged by shocks during the contact process.

Although FIG. 14 shows the first and second dampers 381 and 383 arranged on the first and second concave portions 333*b* and 335*b*, respectively, the configuration is not limited thereto, and the dampers may also be arranged on the first and second convex portions 333*a* and 335*a*.

With reference to FIGS. 3, 6, and 13, the end block 360 may support the connection end of the flexible shaft 310. In an aspect of the present disclosure, the end block 360 may be in the form of a square block but is not limited thereto.

The end block 360 may have an end shaft hole 361, an end wire hole 363, and an end bracket 365 formed therein.

The end shaft hole 361 may be formed in the end block 360 to allow insertion of the distal end portion of the flexible shaft 310 to pass through.

The end wire hole 363 may be formed on the side of the end block 360 facing the panel frame 120, and the end of the wire 340 may be attached thereto.

The end bracket 365 may be formed on the opposite side of the end block 360 facing the panel frame 120, and the end portion of the flexible beam 350 may be coupled thereto.

With reference to FIGS. 3, 6, and 13, a guide rail 370 may be arranged on a rear part of the panel frame 120 and guide the movement direction of the end block 360. The guide rail 370 may include a rail body 371, a guide groove 375, and a guide wall 373.

The rail body 371 may be fixed to the rear part of the panel frame 120 and may have a square block shape in an aspect of the present disclosure. The guide groove 375 may be formed as a recess at the central portion of the rail body 371. The guide wall 373 may be formed to protrude around the rail body 371. As shown in FIG. 6, in an aspect of the present disclosure, the guide wall 373 is arranged to form three sides of the rail body 371 to limit the movement range of the end block 360 in the X and Z axes.

Figure 9A:
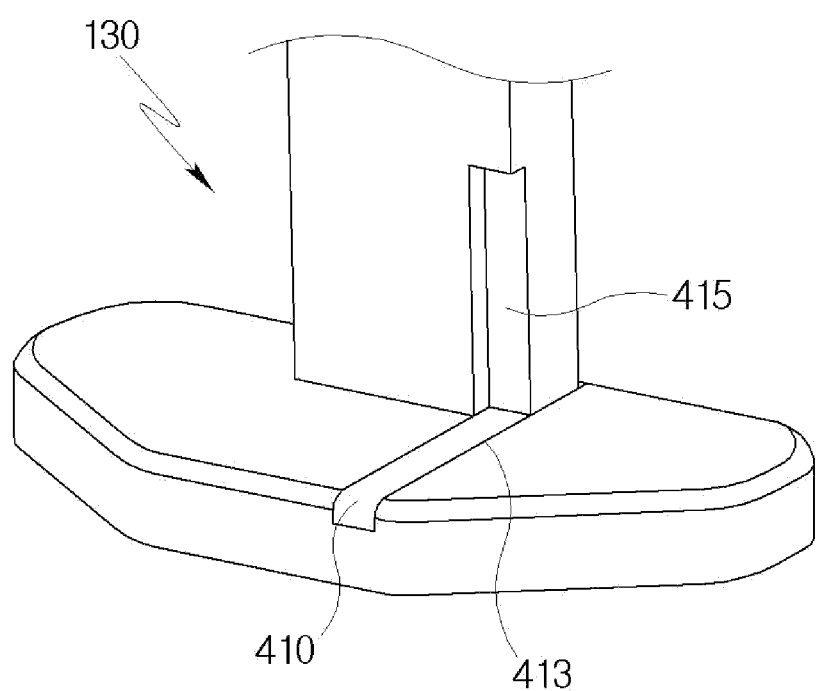
FIG. 9A is a diagram illustrating the position of a lever on a stand when a display panel forms a flat screen according to an aspect of the present disclosure.
Figure 9B:
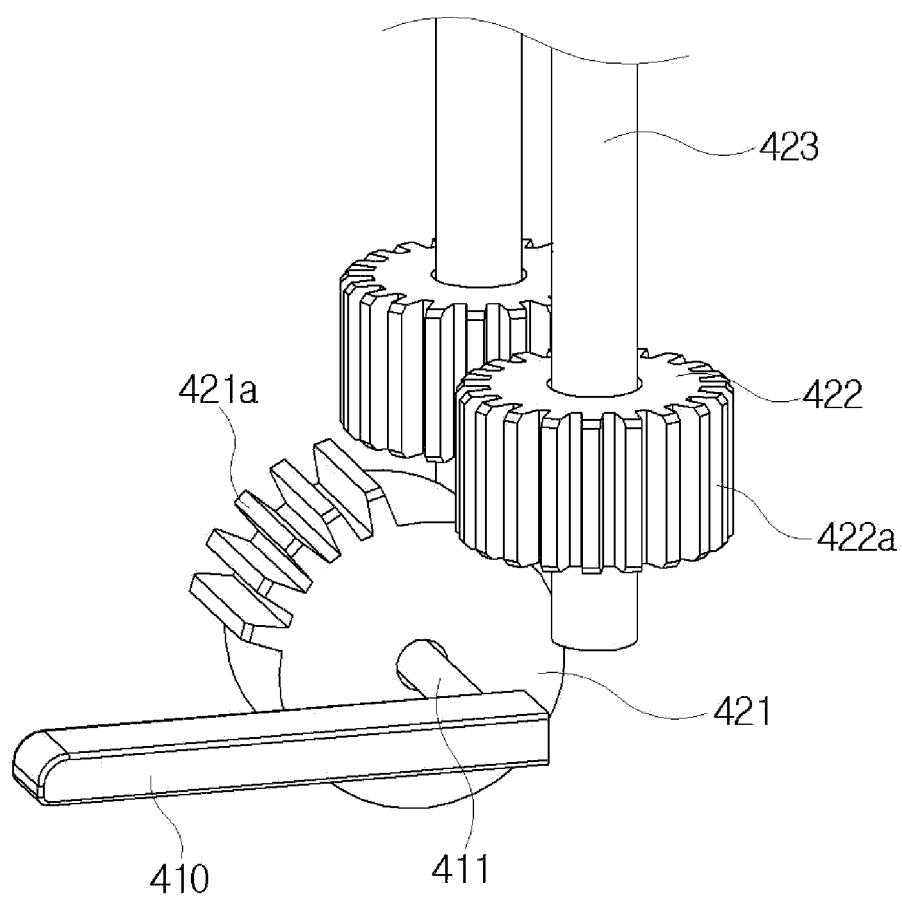
FIG. 9B is a diagram illustrating the position of a gear unit when the lever is positioned on the stand as shown in FIG. 9A according to an aspect of the present disclosure.
Figure 10A:
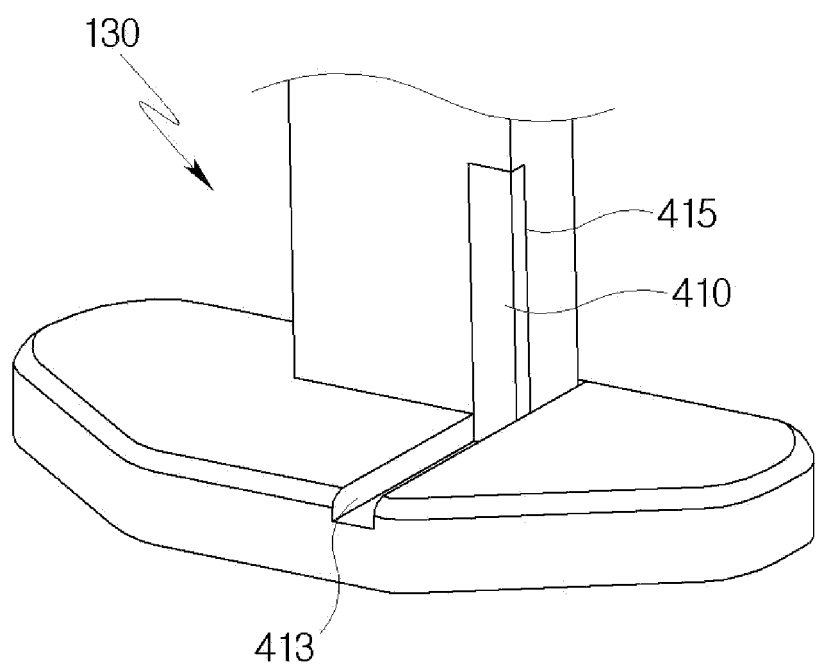
FIG. 10A is a diagram illustrating the position of a lever on a stand when a display panel forms a curved screen according to an aspect of the present disclosure.
Figure 10B:
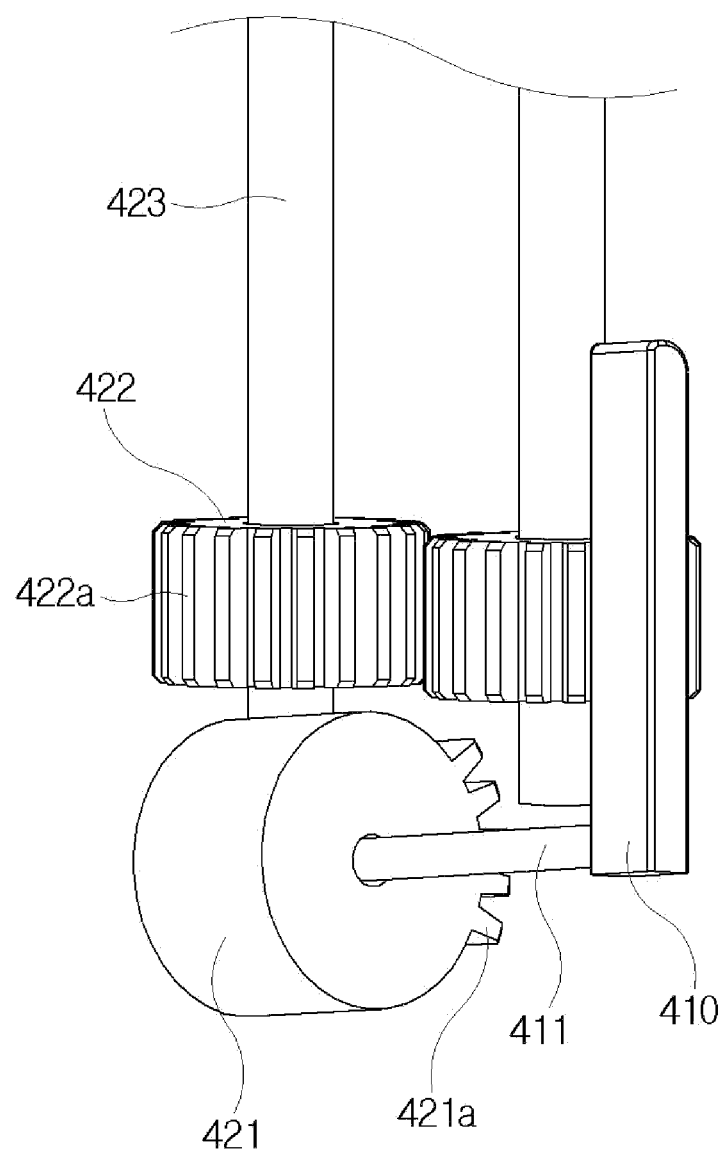
FIG. 10B is a diagram illustrating the position of a gear unit when the lever is positioned on the stand as shown in FIG. 10A according to an aspect of the present disclosure.

Meanwhile, FIG. 8 is a diagram illustrating a rear part of a support member 390 and a driving unit 400 according to an aspect of the present disclosure, FIG. 9A is a diagram illustrating the position of a lever 410 on a stand 130 when a display panel 110 forms a flat screen according to an aspect of the present disclosure, FIG. 9B is a diagram illustrating the position of a gear unit 420 when the lever 410 is positioned on the stand as shown in FIG. 9A according to an aspect of the present disclosure, FIG. 10A is a diagram illustrating the position of the lever 410 on the stand 130 when the display panel 110 forms a curved screen according to an aspect of the present disclosure, and FIG. 10B is a diagram illustrating the position of the gear unit 420 when the lever 410 is positioned on the stand 130 as shown in FIG. 10A according to an aspect of the present disclosure.

And, FIG. 11 is a cross-sectional view taken along line E-E in FIG. 3, and FIG. 12 is a cross-sectional view taken along line F-F in FIG. 3.

With reference to FIGS. 8, 11, and 12, the driving unit 400 may be arranged on the panel frame 120 and may modify the shaft assembly 300. In an aspect of the present disclosure, the driving unit 400 may convert the panel frame 120 from a flat shape to a curved shape.

In an aspect of the present disclosure, the driving unit 400 may include a gear unit 420 and a lever 410.

The gear unit 420 may be arranged on the rear portion of the panel frame 120 and connected to the shaft assembly 300, and may include a lever gear 421, a first gear 422, a linear gear 425, and a second gear 424. The lever 410 may be connected to the gear unit 420 via the lever shaft 411.

As described above, the panel frame 120 may be supported by the stand 130, and the driving unit 400 may be arranged inside the stand 130.

In detail, with reference to FIGS. 9A and 10A, one end of the stand 130 may be placed on a supporting surface such as a wall, floor, or desk. The other end of the stand 130 may be connected to the panel frame 120 to support the panel frame 120.

Here, the stand 130 may have a first lever groove 413 and a second lever groove 415. The first lever groove 413 may be formed in a recessed shape in the stand 130 to serve as an receptacle portion for the lever 410. In the present receptacle portion, the position of the lever 410 may ensure the flexible shaft 310 to become straight.

In addition, the second lever groove 415 may be formed, at a distance from the first lever groove 413, in a recessed form in the stand 130 to serve as a receptacle portion for the lever 410. In the present receptacle portion, the position of the lever 410 may ensure the flexible shaft 310 becomes curved.

However, it is obvious that the positions of the first and second lever grooves 413 and 415 may be reversed or relocated to different locations on the stand 130, depending on the design disclosures.

To make the display panel 110 and the panel frame 120 flat, the lever 410 is rotated and inserted into the first lever groove 413. To make the display panel 110 and the panel frame 120 curved, on the other hand, the lever 410 is rotated and inserted into the second lever groove 415. The user may easily switch the display panel 110 and the panel frame 120 between a flat shape and a curved shape by simply rotating the lever 410.

With reference to FIGS. 9B and 10B, the lever 410 and the lever gear 421 may be connected via the lever shaft 411.

Here, the lever gear may have gear teeth 421a formed only on a predetermined angular range of the peripheral surface to ensure that the first gear 422 rotates only within a specific angle range when the lever 410 is rotated, rather than on the entire peripheral surface of the lever gear 421.

FIG. 9B shows the lever 410 in the position to be inserted into the first lever groove 413, and FIG. 10B shows the lever 410 in the position to be inserted into the second lever groove 415.

When the user rotates the lever 410, the lever gear 421 connected to the lever 410 via the lever shaft 411 rotates by the same amount as the rotation of the lever 410. While the lever gear 421 rotates, the gear teeth 421a of the lever gear 421 mesh with the gear teeth 422a of the first gear 422 for a moment, causing the first gear 422 to rotate. After the rotation of the lever 410 is complete, the gear teeth 421a of the lever gear 421 and the gear teeth 422a of the first gear 422 are no longer meshed.

The first gear 422 may also be connected to the second gear 424 via a gear shaft 423 arranged in the Z-axis direction.

FIG. 12 shows the arrangement of the second gear 424, the linear gear 425, and a link piece 426.

The linear gear 425 may be arranged along the length direction of the flexible beam 350, and the gear teeth 425a of the linear gear 425 may mesh with the gear teeth 424a of the second gear 424.

The link piece 426 may connect the second gear 424 and the wire 340. With reference to FIG. 11, the gear teeth 424a of the second gear 424 may be arranged in pairs with a predetermined distance in the Z-axis direction, and the link piece 426 may be placed between a pair of gear teeth 424a.

Accordingly, with reference to FIG. 12, when the second gear 424 rotates in the direction of arrow K1, the link piece 426 moves in the direction of rotation of the second gear 424, causing the wire 340 to be pulled in the direction of arrow K2.

When the second gear 424 rotates in the direction of arrow K1, the linear gear 425 is pushed in the direction of arrow K3.

That is, as the second gear 424 rotates in the direction of arrow K1, the wire 340 is pulled in the direction of arrow K2, and the flexible beam 350 is pushed in the direction of arrow K3, causing the wire 340 and the flexible beam 350 to move in opposite directions to each other.

Meanwhile, in an aspect of the present disclosure, the flexible shaft is arranged in pairs on both sides of the panel frame 120 with respect to the fixed plate 391. On the fixed plate 391, there are a pair of fixed blocks 392 arranged at a distance from each other to support one end of each of the paired flexible shafts 310.

In addition, a pair of second gears 424 are arranged between a pair of fixed blocks 392, and the paired second gears 424 are connected to the paired first gears 422 via the gear shaft 423, respectively, and the paired first gears 422 are meshed with a single lever gear 421 and arranged accordingly.

Figure 15A:
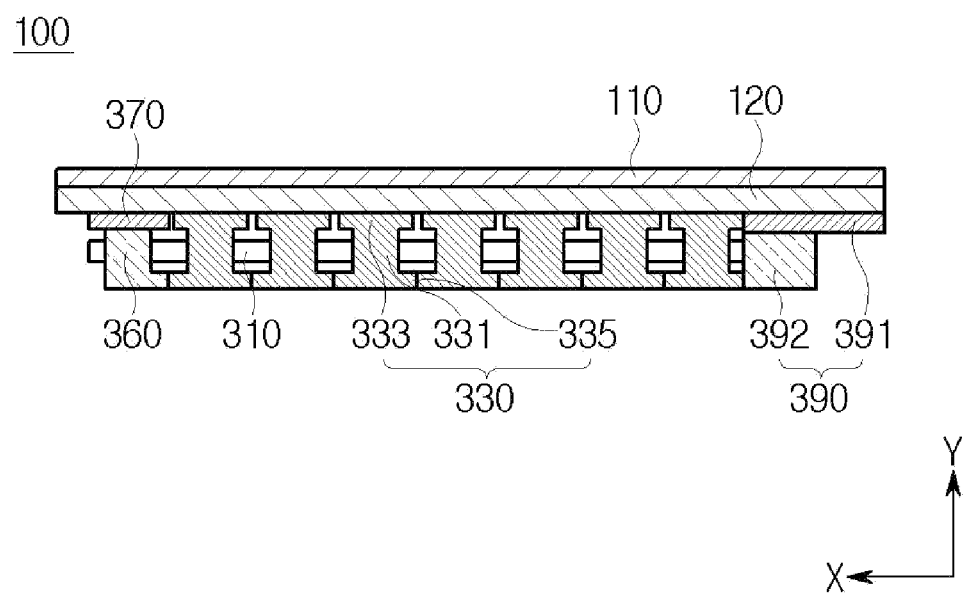
FIG. 15A is a schematic diagram illustrating an arrangement of a flexible shaft and a guide block when the display device forms a flat screen according to an aspect of the present disclosure.
Figure 15B:
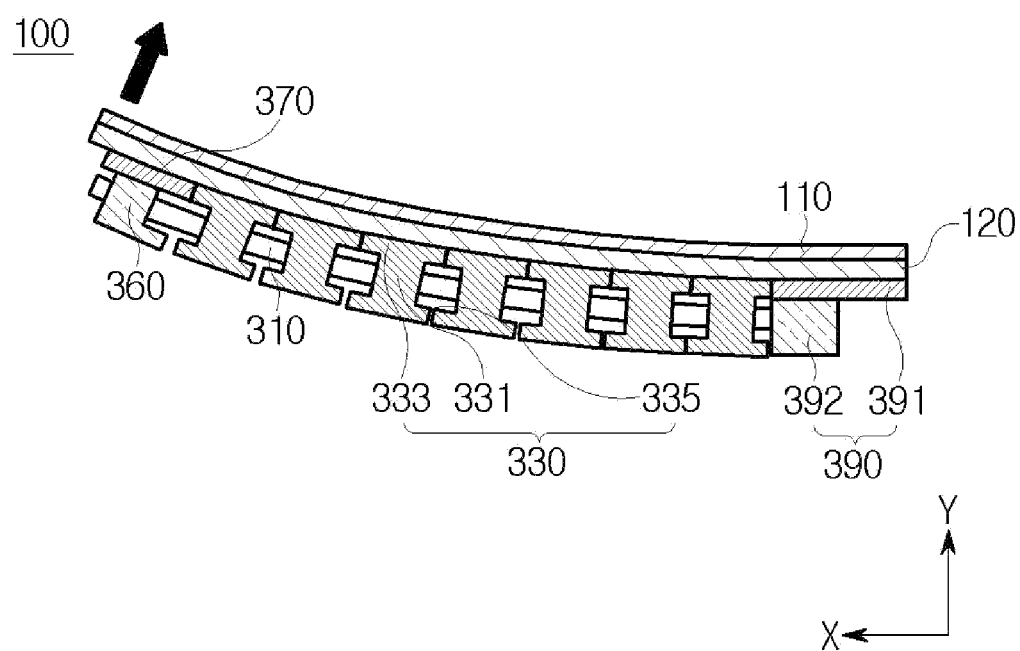
FIG. 15B is a schematic diagram illustrating an arrangement of a flexible shaft and a guide block when the display device forms a curved screen according to an aspect of the present disclosure.

According to the present structure, both sides of the display panel 110 and panel frame 120 bend in the Y-axis direction relative to the fixed plate 391, and transition from a flat shape as shown in FIG. 15A to a curved shape as shown in FIG. 15B.

A display device 100 according to an aspect of the present disclosure is configured as described above, and the operation method thereof will be described hereinafter.

When it is intended to switch the display panel 110 from a flat screen to a curved screen to watch a video, the user may grab and rotate the lever 410 on the stand 130 as shown in FIG. 9A.

With reference to FIG. 9B, when the user grabs and rotates the lever 410, the lever gear 421 rotates because the lever 410 and the lever gear 421 are connected via a lever shaft 411.

The user may remove the lever 410 from the first lever hole 413 and rotate it to be inserted into the second lever hole 415 as shown in FIG. 10A. In the present case, the lever gear 421 rotates by the same amount as the rotation of the lever 410, rotating the first gear 422 meshed with the lever gear 421, as shown in FIG. 10B.

With reference to FIG. 12, the first gear 422 and the second gear 424 are connected by the gear shaft 423 such that the second gear 424 rotates by the same amount as the rotation of the first gear 422.

When switching the display panel 110 and the panel frame 120 from a flat shape to a curved shape, the second gear 424 must rotate in the direction of arrow K1.

As the second gear 424 rotates in the direction of arrow K1, the linear gear 425 meshed with the second gear 424 moves in the direction of arrow K3. As a consequence, the flexible beam 350 is pushed by the force in the direction of arrow K3.

Simultaneously, the wire 340 connected to the second gear 424 via the link piece 426 moves in the direction of arrow K2. The wire 340 is pulled by force in the direction of arrow K2.

FIGS. 15A and 15B show the approximate arrangement of the flexible shaft 310 and the guide block 330 depending on the state of the wire 340 and the flexible beam 350. Although not shown in FIGS. 15A and 15B, the wire 340 and flexible beam 350 are arranged as shown in FIGS. 3 and 13.

With reference to FIG. 15A, the display panel 110 and the panel frame 120 are depicted in their initial flat state. In the present case, since the wire 340 and flexible beam 350 are not subjected to any force, the flexible shaft 310 remain in a straight shape.

With reference to FIGS. 12 and 15B, as the second gear 424 rotates in the direction of arrow K1, the wire 340 is pulled in the direction of arrow K2, and the flexible beam 350 is pushed in the direction of arrow K3, causing the flexible shaft 310 to deform into a curved shape.

As a result, the plurality of guide blocks 330 connected along the longitudinal direction of the flexible shaft 310 are arranged in the curved shape of the flexible shaft 310.

The present causes the multiple guide blocks 330 to form a curved shape, which bends the display panel 110 and the panel frame 120 in the direction of the arrow, transitioning from a flat shape to a curved shape.

Here, the flexible shaft 310 may form a curve until the ends of the adjacent first side blocks 333 of the multiple guide blocks 330 come into contact with each other.

The present means that when the ends of adjacent first side blocks 333 come into contact, the flexible shaft 310 deforms no longer. The distance H between adjacent first side blocks 333 may be determined based on design disclosures such as the curvature, visibility, and prevention of excessive deformation of the display panel 110.

Figure 16A:
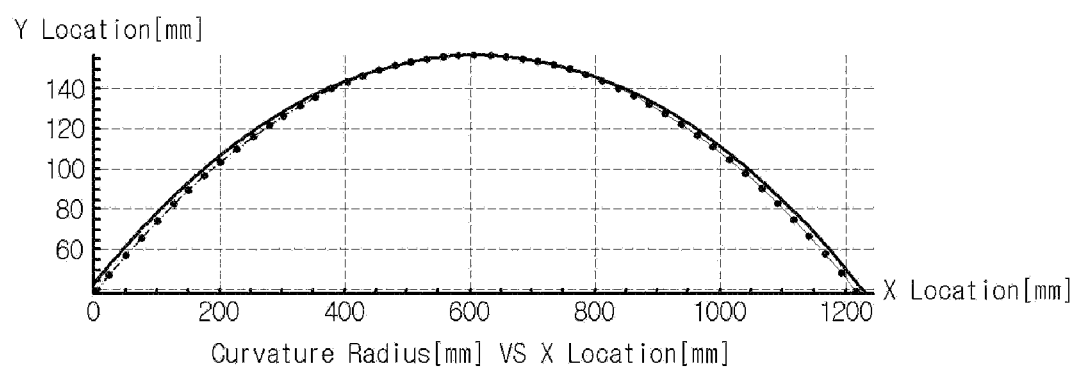
FIG. 16A is a graph illustrating corresponding position values in the X and Y directions at the target curvature of the display device according to an aspect of the present disclosure.
Figure 16B:
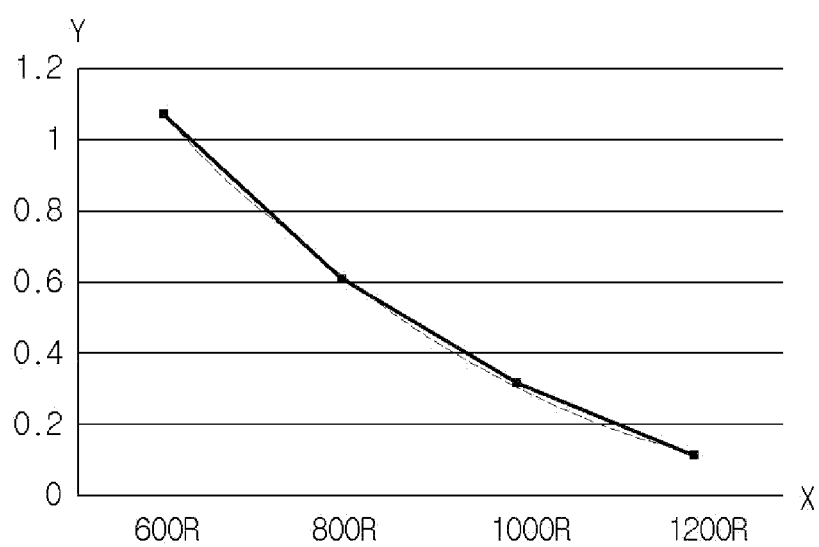
FIG. 16B is a graph illustrating the relationship between the target curvature (x) and the distance (y; H) in the display device according to an aspect of the present disclosure.

For example, the distance H may be determined to comply with design disclosures as shown in FIGS. 16A and 16B.

FIG. 16A is a graph illustrating corresponding position values in the X and Y directions at the target curvature of the display device according to an aspect of the present disclosure, and FIG. 16B is a graph illustrating the relationship between the target curvature (x) and the distance (y; H) in the display device according to an aspect of the present disclosure.

The information provided in FIGS. 16A and 16B is just one example of design disclosures for deriving the distance H required to achieve the target curvature, and other design disclosures may be applied.

With reference to FIG. 16A, it shows the Y-axis position values (Y Location; mm) corresponding to the X-axis position values (X Location; mm) in the curved display panel (110) and panel frame (120) at the target curvature.

FIG. 16A shows the Y-axis position values (Y Location; mm) corresponding to the X-axis position values (X Location; mm) according to the target curvature of the curved display panel 110 and panel frame 120.

That means when transitioning from a flat screen to a curved screen, the side edges of the display panel 110 and panel frame 120 may bend up to approximately 140 mm in the Y-axis direction with respect to the center thereof.

The graph presented in FIG. 16B shows the distance value (y; H in FIG. 13) associated with the target curvature value x. The present relationship may be derived through the following functional formula.

$$y = 0.065\ x^2 - 0.6402\ x + 1.6395$$

$(x = \text{target curvature}, y = \text{distance }(H))$

When the target curvature x is set to the values in Table 1, the distance (y; H) may be obtained through the above formula and is derived as follows.

TABLE 1

| x | y (mm) |
|---|---|
| 600R | 1.0682 |
| 800R | 0.6072 |
| 1000R | 0.3156 |
| 1200R | 0.1146 |

With reference to Table 1, when the target curvature is set to 800 R, the distance H between the first side blocks 333 may be designed to be 0.6072 mm.

That is, in the case of designing the distance value H to be 0.6072 mm, when the user switches the display device from a flat screen to a curved screen, the side edges of the display panel 110 and panel frame 120 will bend up to approximately 140 mm in the Y-axis direction, forming a curved screen.

The above design disclosures are just an example, and the distance value H may be determined by other design disclosures.

According to an aspect of the present disclosure, the display device 100 may be switched between a flat screen and a curved screen by a simple and easy operation of the user grabbing and rotating the lever 410, based on the above-described configuration and operation method.

When switching to a curved screen, a predetermined curvature may be formed on the screen through a smooth transition, allowing for accurate implementation of the desired curvature shape.

The ultimate goal is to improve users' visual satisfaction.

The display device according to the present disclosure may be described as follows.

A display device according to an aspect of the present disclosure includes a panel frame and a bending member arranged on the panel frame and configured to deform the shape of the panel frame, wherein the bending member may include a shaft assembly arranged on the panel frame and a driving unit arranged on the panel frame and configured to deform the shaft assembly.

Also, according to some aspects of the present disclosure, the shaft assembly may include a flexible shaft arranged on a rear surface of the panel frame and configured to deform in shape, a support member connected to the rear surface of the panel frame and configured to support one end of the flexible shaft, and a guide member arranged on the rear surface of the panel frame and configured to guide deformation of the flexible shaft.

Also, according to some aspects of the present disclosure, the guide member may include a plurality of guide blocks arranged parallel on the rear surface of the panel frame and a shaft hole formed in the guide blocks to be penetrated by the flexible shaft.

Also, according to some aspects of the present disclosure, the guide blocks may include a center block in which the shaft hole is formed, a first side block arranged in the direction facing the panel frame from the center block and extending in both lateral directions of the center block, and a second side block arranged in the opposite direction to the first side block and extending in both lateral directions of the center block.

Also, according to some aspects of the present disclosure, the first side blocks adjacent to each other, among the plurality of guide blocks, may be configured to be spaced apart at a predetermined distance at one end thereof in response to the flexible shaft being in a straight shape and come into contact with each other at the one end thereof to limit the range of curvature of the flexible shaft in response to the flexible shaft being transitioned from the straight shape to a curved shape.

Also, according to some aspects of the present disclosure, the second side blocks adjacent to each other, among the plurality of guide blocks, may be configured to come into contact at one end thereof, in response to the flexible shaft being in a straight shape, to maintain the panel frame in a flat shape.

Also, according to some aspects of the present disclosure, the guide member may include a wire hole formed to penetrate both sides of the first side block and a wire being inserted into the wire hole to connect the plurality of guide blocks.

Also, according to some aspects of the present disclosure, the guide member may include a beam support loop arranged on the second side block and a flexible beam arranged to penetrate the beam support loop and connect the plurality of guide blocks.

Also, according to some aspects of the present disclosure, one of the first side blocks adjacent to each other may include a first convex portion protruding outward the one end thereof, another one of the first side blocks adjacent to each other may include a first concave portion recessed inward the one end thereof.

Also, according to some aspects of the present disclosure, one of the second side blocks adjacent to each other may include a second convex portion protruding outward the one end thereof, another one of the second side blocks adjacent to each other may include a second concave portion recessed inward the one end thereof.

Also, according to some aspects of the present disclosure, the guide member further includes a damper member arranged between a contact surface between the first concave portion and the first convex portion or between the second concave portion and the second convex portion to absorb shocks, wherein the damper member may include a first damper arranged on the first concave portion or the first convex portion and having a damper hole formed to be penetrated by the wire and a second damper arranged on the second concave portion or the second convex portion.

Also, according to some aspects of the present disclosure, the guide member may include an end block configured to support the other end of the flexible shaft, an end shaft hole formed in the end block to be penetrated by the other end of the flexible shaft, an end wire hole formed in the end block and coupled to an end of the wire, and an end bracket formed on the end block and coupled to one end of the flexible beam.

Also, according to some aspects of the present disclosure, the guide member may further include a guide rail arranged on the rear surface of the panel frame and configured to guide a movement direction of the end block.

Also, according to some aspects of the present disclosure, the guide rail may include a rail body, a guide groove formed in a recessed form on the rail to receive the end block, and a guide wall formed to protrude from the sides of the guide groove on the rail body and guide the movement of the end block.

Also, according to some aspects of the present disclosure, the support member may include a fixed plate connected to the rear surface of the panel frame, a line groove formed in the fixed plate in the direction of arrangement of the flexible shaft to receive the wire, and a fixing block arranged on the fixed plate and coupled to the one end of the flexible shaft.

Also, according to some aspects of the present disclosure, the driving unit may include a gear unit arranged on the rear surface of the panel frame and connected to the shaft assembly and a lever connected to the gear unit via a lever shaft, wherein the gear unit may be driven by rotating the lever.

Also, according to some aspects of the present disclosure, the gear unit may include a lever gear connected to the lever shaft and having gear teeth formed on a part of a peripheral surface thereof, a first gear arranged adjacent to the lever gear and configured to mesh with the lever gear in response to rotation of the lever gear, a linear gear arranged along a length direction of the flexible beam, and a second rear connected to the first gear via a gear shaft and meshed with the linear gear.

Also, according to some aspects of the present disclosure, the gear unit may further include a link piece connecting the second gear and the wire.

Also, according to some aspects of the present disclosure, the display device further includes a stand connected to the panel frame and placed on a supporting surface, wherein the driving unit may include a first lever groove formed on the stand to receive the lever in response to the lever rotating for the flexible shaft to be in a straight shape and a second lever groove formed on the stand to receive the lever in response to the lever rotating for the flexible shaft to be in a curved shape.

Also, according to some aspects of the present disclosure, the flexible support may be arranged in pairs in both directions of the panel frame with respect to the fixed plate on which a pair of fixing blocks are arranged to be spaced apart to support one end of the pair of flexible shafts, respectively, and the second gear may be arranged in pairs between the pair of the fixing blocks and connected each to each of the pair of the first gears meshed with the lever gear.

According to an aspect disclosed in the present disclosure, users may switch between flat and curved screens by performing a simple and straightforward operation of grasping and rotating a lever.

When switching to a curved screen, a constant curvature is formed on the screen to enable a smooth transition, making it possible to accurately implement the curvature shape of the screen.

The ultimate goal is to improve users' visual satisfaction.

The content of the problem to be solved, the means for solving the problem, and the effects mentioned above are not essential features of the claims, so the scope of the claims is not limited by the content disclosed in the disclosure.

The above description merely illustrates a specific aspect of the display device.

Therefore, it should be noted that those skilled in the art may easily understand that the present disclosure may be substituted or modified in various forms without departing from the scope of the claims below and the intention of the present disclosure.

The display device according to the aspects of the present disclosure may be applied to mobile devices, video phones, smartwatches, watch phones, wearable apparatuses, foldable apparatuses, rollable apparatuses, bendable apparatuses, flexible apparatuses, curved apparatuses, sliding apparatuses, variable apparatuses, electronic notebooks, e-books, portable multimedia players (PMPs), personal digital assistants (PDAs), MP3 players, mobile medical devices, desktop personal computers (PCs), laptop PCs, netbook computers, workstations, navigation devices, car navigation devices, car display devices, car devices, theater devices, theater display devices, televisions, wallpaper devices, signage devices, game devices, notebooks, monitors, cameras, camcorders, home appliances, etc.

Although aspects of the present disclosure have been described in detail with reference to the accompanying drawings, it should be noted that the present disclosure is not necessarily limited to these aspects and may be modified in various ways without departing from the scope of the technical concept of the disclosure. Therefore, the aspects disclosed in the present disclosure are not intended to limit but to describe the technical idea of the present disclosure, and the scope of the technical idea of the present disclosure is not limited by the aspects. Therefore, it should be understood that the aspects described above are exemplary and not limited in all aspects. The scope of protection of technical ideas of the present disclosure shall be construed by the following claims, and all technical ideas within the scope equivalent thereto shall be construed as being within the scope of the rights of the present disclosure.

What is claimed is:

1. A display device comprising:
   a panel frame; and
   a bending member arranged on the panel frame and configured to deform the shape of the panel frame,
   wherein the bending member comprises:
   a shaft assembly arranged on the panel frame; and
   a driving unit arranged on the panel frame and configured to deform the shaft assembly.

2. The display device of claim 1, wherein the shaft assembly comprises:
   a flexible shaft arranged on a rear surface of the panel frame and configured to deform in shape;
   a support member connected to the rear surface of the panel frame and configured to support one end of the flexible shaft; and
   a guide member arranged on the rear surface of the panel frame and configured to guide deformation of the flexible shaft.

3. The display device of claim 2, wherein the guide member comprises:
   a plurality of guide blocks arranged in parallel on the rear surface of the panel frame; and
   a shaft hole formed in the guide blocks to be penetrated by the flexible shaft.

4. The display device of claim 3, wherein each of the plurality of guide blocks comprises:
   a center block in which the shaft hole is formed;
   a first side block arranged in a direction facing the panel frame from the center block and extending in both lateral directions of the center block; and
   a second side block arranged in an opposite direction to the first side block and extending in both lateral directions of the center block.

5. The display device of claim 4, wherein the first side blocks of the guide blocks adjacent to each other, among the plurality of guide blocks, are configured to be spaced apart at a predetermined distance at one ends of the first side blocks in response to the flexible shaft being in a straight shape and come into contact with each other at the one end thereof to limit the range of curvature of the flexible shaft in response to the flexible shaft being transitioned from the straight shape to a curved shape.

6. The display device of claim 4, wherein the second side blocks of the guide blocks adjacent to each other, among the plurality of guide blocks, are configured to come into contact at one ends of the second side blocks, in response to the flexible shaft being in a straight shape, to maintain the panel frame in a flat shape.

7. The display device of claim 4, wherein the guide member comprises:
   a wire hole formed to penetrate both sides of the first side block of each of the guide blocks; and
   a wire being inserted into the wire hole to connect the plurality of guide blocks.

8. The display device of claim 7, wherein the guide member comprises:
   a beam support loop arranged on the second side block; and
   a flexible beam arranged to penetrate the beam support loop and connect the plurality of guide blocks.

9. The display device of claim 7, wherein one of the first side blocks of the guide blocks adjacent to each other comprises a first convex portion protruding outward one end of the one of the first side blocks, another of the first side blocks of the guide blocks adjacent to each other comprises a first concave portion recessed inward the one end of the another of the first side blocks.

10. The display device of claim 9, wherein one of the second side blocks of the guide blocks adjacent to each other comprises a second convex portion protruding outward the one end of the one of the second side blocks, another one of the second side blocks of the guide blocks adjacent to each other comprises a second concave portion recessed inward the one end of the another one of the second side blocks.

11. The display device of claim 10, wherein the guide member further comprises a damper member arranged between a contact surface between the first concave portion and the first convex portion or between the second concave portion and the second convex portion to absorb shocks,
   wherein the damper member comprises:
   a first damper arranged on the first concave portion or the first convex portion and having a damper hole formed to be penetrated by the wire; and
   a second damper arranged on the second concave portion or the second convex portion.

12. The display device of claim 8, wherein the guide member comprises:
   an end block configured to support the other end of the flexible shaft;
   an end shaft hole formed in the end block to be penetrated by the other end opposite the one end of the flexible shaft;
   an end wire hole formed in the end block and coupled to an end of the wire; and
   an end bracket formed on the end block and coupled to one end of the flexible beam.

13. The display device of claim 12, wherein the guide member further comprises a guide rail arranged on the rear surface of the panel frame and configured to guide a movement direction of the end block.

14. The display device of claim 13, wherein the guide rail comprises:
   a rail body;
   a guide groove formed in a recessed form on the rail to receive the end block; and
   a guide wall formed to protrude from both sides of the guide groove on the rail body and guide the movement of the end block.

15. The display device of claim 8, wherein the support member comprises:
   a fixed plate connected to the rear surface of the panel frame;
   a line groove formed in the fixed plate in a direction of arrangement of the flexible shaft to receive the wire; and
   a fixing block arranged on the fixed plate and coupled to the one end of the flexible shaft.

16. The display device of claim 15, wherein the driving unit comprises:
 a gear unit arranged on the rear surface of the panel frame and connected to the shaft assembly; and
 a lever connected to the gear unit via a lever shaft,
wherein the gear unit is driven by rotating the lever.

17. The display device of claim 16, wherein the gear unit comprises:
 a lever gear connected to the lever shaft and having gear teeth formed on a part of a peripheral surface thereof;
 a first gear arranged adjacent to the lever gear and configured to mesh with the lever gear in response to rotation of the lever gear;
 a linear gear arranged along a length direction of the flexible beam; and
 a second gear connected to the first gear via a gear shaft meshed with the linear gear.

18. The display device of claim 17, wherein the gear unit further comprises a link piece connecting the second gear and the wire.

19. The display device of claim 17, further comprising a stand connected to the panel frame and placed on a supporting surface,
 wherein the driving unit comprises:
 a first lever groove formed on the stand to receive the lever in response to the lever rotating for the flexible shaft to be in a straight shape; and
 a second lever groove formed on the stand to receive the lever in response to the lever rotating for the flexible shaft to be curved.

20. The display device of claim 17, wherein the flexible support is arranged in pairs in both directions of the panel frame with respect to the fixed plate on which a pair of fixing blocks are arranged to be spaced apart to support one end of the pair of flexible shafts, respectively, and the second gear is arranged in pairs between the pair of the fixing blocks and connected each to each of the pair of the first gears meshed with the lever gear.

* * * * *